United States Patent [19]
Huveteau et al.

[11] Patent Number: 5,294,093
[45] Date of Patent: Mar. 15, 1994

[54] SAFETY VALVE

[75] Inventors: Jean L. Huveteau; Gerard Line, both of Friville Escarbotin, France

[73] Assignee: Watts Investment Company, Wilmington, Del.

[21] Appl. No.: 9,687

[22] Filed: Jan. 27, 1993

[51] Int. Cl.$^5$ .................... F16K 7/16; F16K 31/524
[52] U.S. Cl. ........................ 251/263; 251/331
[58] Field of Search ........... 251/251, 262, 263, 331, 251/335.2; 74/25, 56, 57, 122

[56] References Cited

U.S. PATENT DOCUMENTS

| | | | |
|---|---|---|---|
| 3,081,063 | 3/1963 | Seltsam | 251/331 |
| 3,301,525 | 1/1967 | Chernak et al. | 251/331 |
| 4,166,606 | 9/1979 | Kawolics et al. | 251/335.2 |
| 4,176,686 | 12/1979 | Stahle | 251/331 |
| 4,552,336 | 11/1985 | Pastrone | 251/331 |
| 5,029,806 | 7/1991 | Huo-Lien et al. | 251/263 |
| 5,103,857 | 4/1992 | Kuhn et al. | 251/263 |

FOREIGN PATENT DOCUMENTS

| | | | |
|---|---|---|---|
| 2116030 | 1/1979 | Fed. Rep. of Germany | 251/263 |
| 856274 | 12/1960 | France | 251/331 |
| 802840 | 10/1958 | United Kingdom | 251/263 |

*Primary Examiner*—George L. Walton
*Attorney, Agent, or Firm*—Fish & Richardson

[57] ABSTRACT

A safety valve includes a body, a chamber defined by the body, two conduits leading into the chamber, a first conduit being upstream with respect to the chamber and the other conduit, a sleeve, a spring housed by the sleeve, and a clapper drawn by the spring. The clapper, when drawn, forms a passage between the chamber and one of the conduits.

11 Claims, 3 Drawing Sheets

SAFETY VALVE

BACKGROUND OF THE INVENTION

The invention relates to a safety valve.

A typical safety valve includes a body which defines a chamber into which two fluid conduits run. The flow of the fluid through the conduits is controlled by the valve. A sleeve houses a spring which biases a clapper towards a seat. A passage is thus provided between the chamber and one of the conduits.

Generally, the clapper has two opposite faces, an extreme face, which is displaced to obstruct the passage, and a rear face, which is biased by an elastic resilient member, such as a spring, against a thrust-stop, which is associated with the sleeve. The characteristics of the spring, along with the distance provided between the thrust-stop and the clapper's rear face, determine the "tear-off" pressure of the clapper, the pressure at which the clapper is torn from its seat.

Use of a thrust-stop to support the elastic member has been disclosed in French Patent No. A-2-528.526. The thrust-stop includes a centrally located basin-like cap in which the elastic member is located. A mechanical part in the shape of a skirt is joined to the rim of the cap. The skirt rises concentrically in relation to the cap. Its free end is anchored in a bore, the anchoring being on the level of a groove and precluding any withdrawal from the thrust-stop. As a consequence, the tear-off spring cannot be replaced. However, an adjustment of the tear-off pressure may be made by changing the penetration distance of the thrust-stop in the bore, e.g., by increasing the penetration distance. The thrust-stop may be threaded into the bore.

Safety valves also generally include a servicing and handling assembly connected with the clapper, including a handling rod by which the clapper can be raised. The flow circuit can thus be closed "upstream."

Means are associated with the sleeve of the valve body that cooperate with the handling assembly to enable the voluntary handling operation. In concentrational valves, the clapper is mechanically dependent on the foot of the handling rod. When mounting and dismounting, the handling assembly is connected with the handling rod so that the handling assembly can be removed from the handling rod. Thus, the supporting thrust-stop of the spring can be reached more easily.

The displacement of the clapper between its open and closed positions is guided by the handling rod. The guidance is generally accomplished by a supplementary member means which closes the sleeve, and by means which cooperate with those of the handling assembly. This supplementary member, which is usually on the body of the valve, can easily be removed. The clapper has an obstruction head which is at too great a distance from the clapper to adequately guide it. As a result, further means are required to provide guidance.

To protect the parts housed in the sleeve from damage by the fluid, and/or to assure flow without excess turbulence, a closing membrane is generally associated with the clapper at the entrance of the corresponding sleeve. The membrane is secured in an air-tight manner and is imperviously fixed around the periphery of the sleeve.

As these valves are currently designed, their tear-off pressure is adjustable by screwing and unscrewing the thrust-stop. An incorrect adjustment can hinder normal service of the valve, jeopardizing safety and potentially causing serious damage.

Accordingly, it is an object of the invention to provide a valve wherein the tear-off pressure cannot be changed. A further object of the invention is to reduce the number of parts, and to achieve a feasible, simplified safety valve apparatus at an affordable price.

SUMMARY OF THE INVENTION

According to one aspect of the invention, a safety valve comprises: a body; a chamber defined by the body; two conduits leading into said chamber, a first conduit being upstream with respect to the chamber and the other conduit; a sleeve; a spring housed by the sleeve; and a clapper drawn by the spring, the clapper, when drawn, forming a passage between the chamber and one of the conduits.

Preferred embodiments of this aspect of the invention may include one or more of the following features. The clapper comprises two opposite faces, one face being an extreme face and the other face being a rear face. Preferably, the extreme face of the clapper is an obstructing face. More preferably, the rear face is driven by the spring, the rear face being backed against a thrust stop, the thrust stop including a cap in which the spring is centered, the thrust stop further, being operatively associated with the sleeve. The clapper is shaped like a supporting cupel on which the spring is centered. The clapper is supported by a seat. Preferably, an impervious membrane is inserted between the clapper and the seat, an outer edge of the membrane being fixed onto the body, the membrane covering the obstructing face and part of a side surface of the cap, the membrane further reaching a strip of the sleeve. The safety valve further comprises an operating assembly connected with the clapper, the operating assembly comprising a handling rod which passes through the thrust-stop; and first and second complementary camming or driving means operatively associated with the valve body. Preferably, the first and second complementary camming or driving means are adapted to move the clapper by translation and transfer in a direction parallel to a longitudinal axis of the handling rod. More preferably, the safety valve further comprises: an inner wall in the thrust-stop which guides translation of the clapper; an outer wall of the clapper operatively associated with an inner wall of the thrust-stop; and a face of the cap which bears directly on the second camming or driving means, the second camming or driving means operatively associated with the operating assembly The second camming or driving means includes at least one slope. Preferably, a foot portion of the handling rod is operatively associated with the clapper by a fixation means which provides at least one degree of freedom. More preferably, the fixation means comprises an elastic, irreversible anchor, a skirt is connected to the cap along a lower edge of the cap, the skirt containing a rim, the rim being elastically engaged behind a thrust stop surface of a groove in a sleeve bore, the skirt rises concentrically in relation to the cap, the distance between the rim and the lower edge is nearly equal to the distance between the thrust stop surface and an edge of the valve body minus the thickness of the membrane and the area containing the membrane is stiffened by an intermediate plate.

Other features and advantages of the invention will be apparent from the following description of a presently preferred embodiment, and from the claims.

DESCRIPTION OF THE PREFERRED EMBODIMENT(S)

Figure 1:
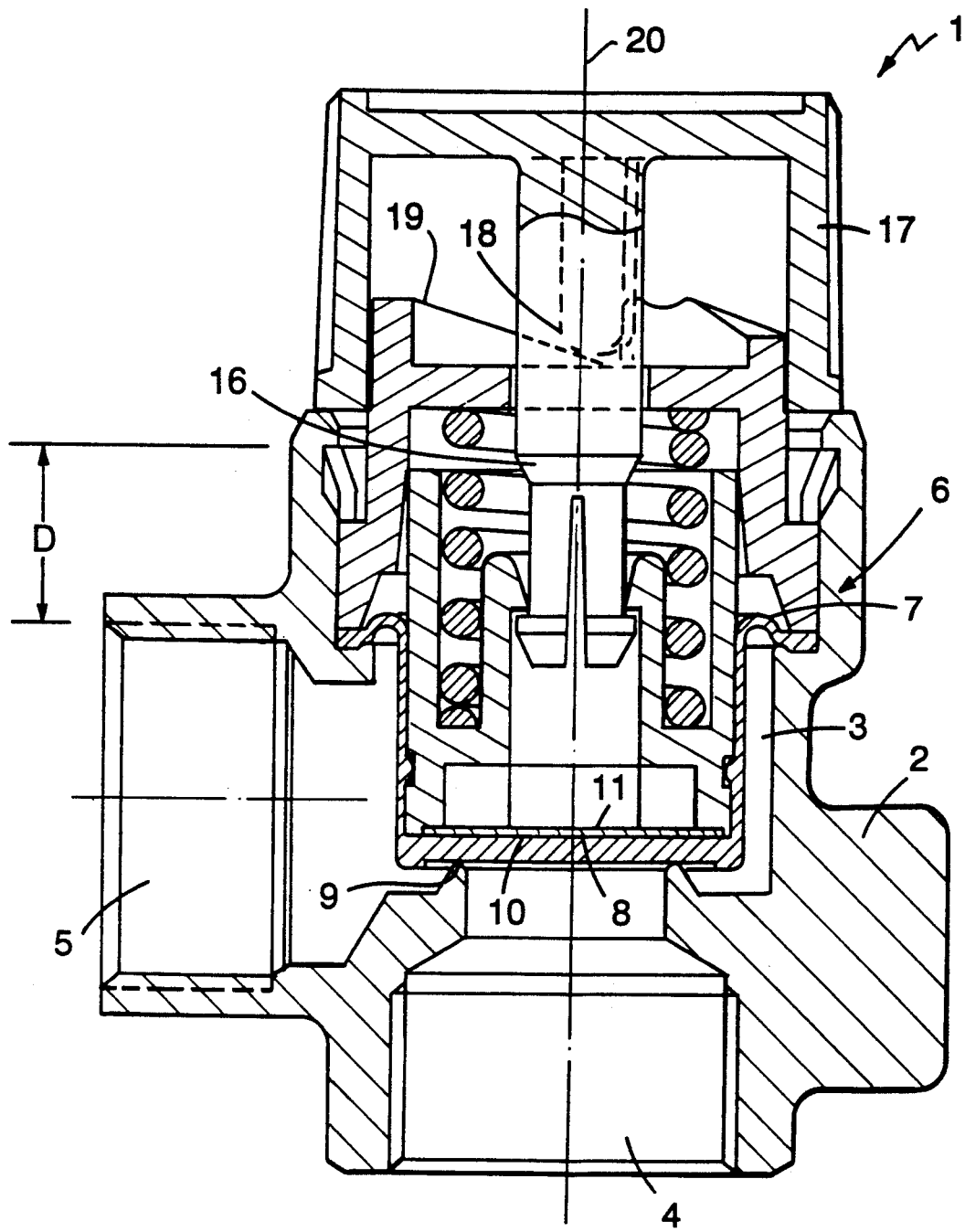
FIG. 1 is a longitudinal, sectional view of a safety valve, according to the invention.

Referring to the FIGURES, valve 1 includes a body 2 defining chamber 3 into which two conduits (or leads) 4 and 5 run. A sleeve 6 houses a spring 7 which biases a clapper 8 towards a seat 9 in a passageway between a chamber 3 and the conduits 4 (or 5). Conduit 4 is the "upstream" conduit. Clapper 8 has two opposite faces 10 and 11. Face 10, the "extreme" or end face, obstructs the passageway in its closed position. Face 11, the "rear" face, is biased by spring 7. Spring 7 bears on a thrust-stop 12, which is operatively associated with sleeve 6.

The clapper 8 is shaped like a supporting cupel in which the spring 7 is centered. The clapper 8 is supported by the seat 9, and it bears upon the seat 9 through an impervious resilient membrane 13. An outer edge 14 of membrane 13 is attached to the valve body, for instance to the sleeve 6 or the chamber 3 entry contour. The outer edge 14 is specifically applied to a bearing "header" or strip 15, through means explained below.

By means of a handling rod 16, which passes through thrust-stop 12, the clapper 8 is connected with a handling and operating assembly 17, itself equipped with camming or driving means 18 and 19. The camming or driving means 18 and 19 are connected with the body of the valve 1 to provide mechanical integrity. Engagement of the camming or driving means 18 and 19 initiates the operation and the movement of the clapper 8, via a translation which is parallel to the longitudinal axis 20 of the handling rod 16.

The thrust-stop 12 includes a basin cap 21 in which the spring 7 is centered. A skirt 23 is joined along the lower edge of the cap 21, and rises concentrically with relation to the cap 21. The skirt 23 associates the cap 21 with sleeve 6. The skirt 23 can be screwed into sleeve 6. A free end 24 of the skirt 23 preferably includes a rim 37. The rim 37 is elastically inserted behind the thrust and stop surface 26 of a groove 25 provided in a bore of sleeve 6 to prevent any irregular movement or slipping out of the cap 21.

The inner wall of thrust-stop 12 cooperates locally in guiding the translation of clapper 8. The clapper 8 has an outer face 28, a section of which is complementary to the inner face 27 of the thrust-stop 12. A face 29 of the cap bottom 38, opposite face 30 which supports spring 7, directly supports and bears camming or driving means 19, which cooperates with camming or driving means 18. Camming or driving means 18 drives the handling operation and is carried by the handling assembly 17.

Preferably, the handling assembly 17 is, for example, guided in rotation around axis 20. In this case, the camming or driving means 19, borne and supported by the thrust-stop 12, includes at least one slope 31. The camming or driving means 19 preferably includes several slopes disposed on the same circumference at regularly distributed angles.

To enable guidance of the clapper 8 exclusively by the inner face 27 of the thrust-stop 12, the foot of the handling rod 16 is associated with the clapper 8 through a fixation means 32, which offers at least one degree of freedom.

The fixation means 32 preferably requires an elastic, irreversible anchor. The fixation means 32 are formed, for example, on a clapper hub 33, the entrance of which has a narrow part which defines a thrust surface 34. The handling rod 16 terminates at a head 35 which elastically moves up to and behind the thrust surface 34. To provide the necessary elasticity, the head 35 is, for example, divided into two elastic "tongues" 35a.

Figure 2:
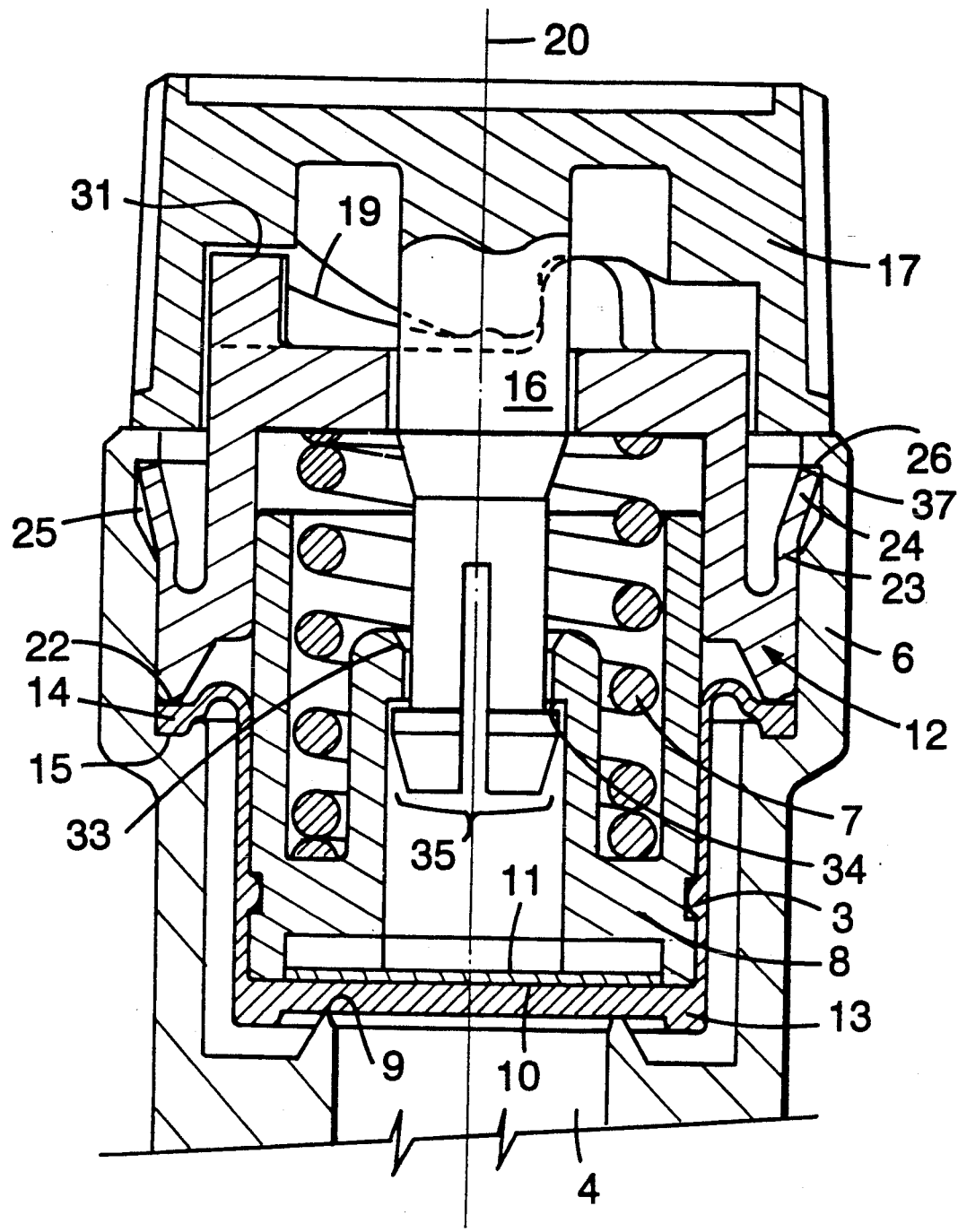
FIG. 2 is an enlarged, partial cross-sectional view of the valve of FIG. 1.
Figure 3:
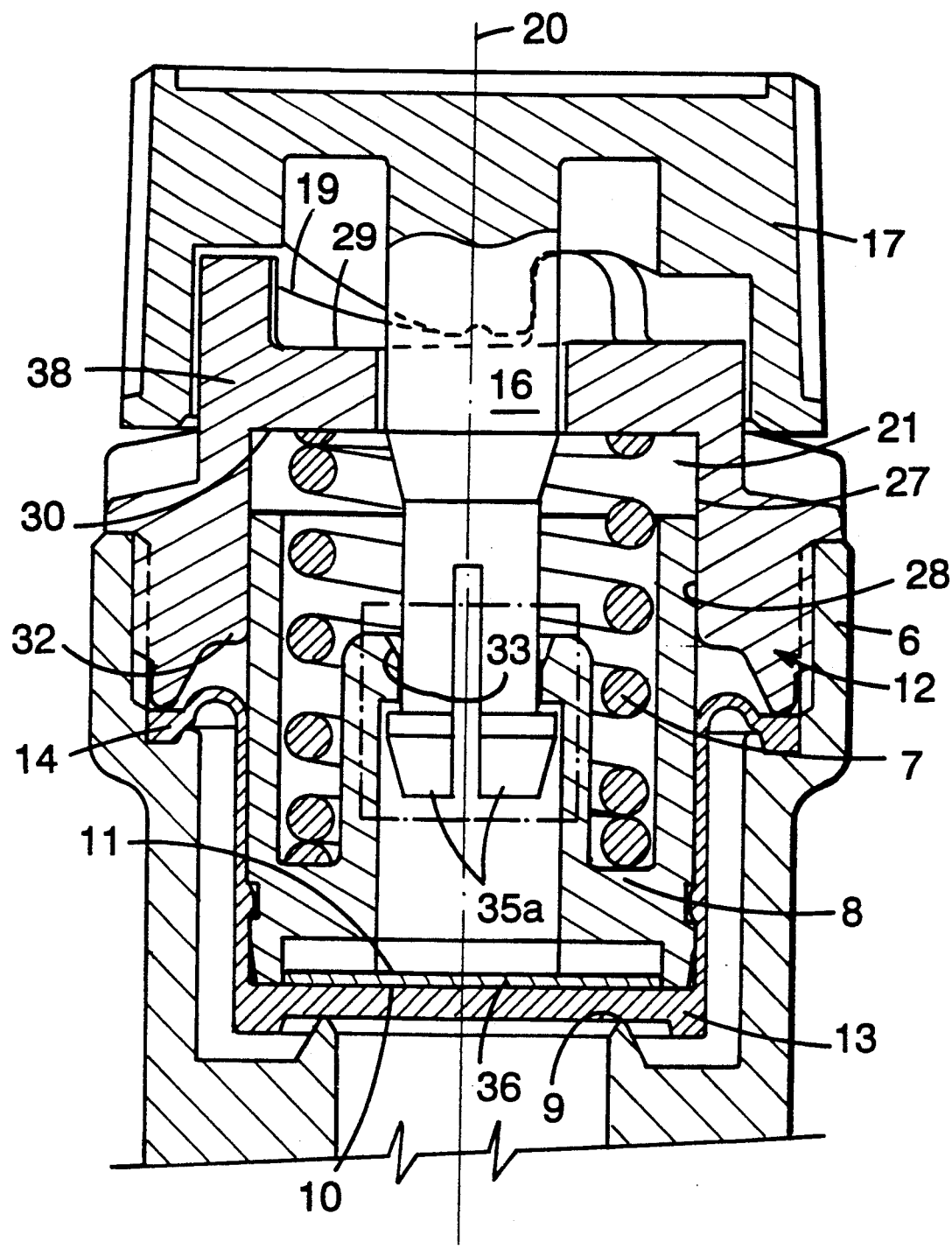
FIG. 3 is a cross-sectional view of a valve according to another embodiment of the invention.

In the preferred embodiment (FIG. 2), in which the clapper 8 is mounted elastically, a distance D between the free end 24 of the skirt 23, and the lower end 22 of the cap 21 carrying the skirt 23, is very nearly equal to the distance measured between the thrust and stop surface 26 of the groove 25 and the strip 15 of the valve body, once the thickness of the membrane 13 has been deducted. Thus, once the thrust-stop 12 has been mounted, the membrane 13 remains in a blocked position, without having to utilize separate means. There is no risk of the membrane 13 being crushed or any other risk of damage.

The mounting of the parts ensures a certain tear-off pressure. When the operating assembly is in position, it cannot be dismounted and removed to afford access to the clapper 8, without the handling rod 16 being broken. This will immediately show that the valve 1 is defective. The spring 7 can not be changed without the change being perceived. Therefore, even with the screwed version, inviolability is assured. The screwed version offers the advantage that pressure determined "cartridges" can be readily exchanged.

Due to the multi-functional aspect of the thrust-stop 12 assembly, the number of parts needed for building the valve 1 is greatly reduced. The thrust-stop 12 provides and safely ensures the pressure limit, takes up the spring 7 backing support, maintains the membrane 13 in its correct position, guides the clapper 8 and receives the camming or driving means 18 and 19 which cooperate with the handling assembly 17. Advantageously, in the preferred embodiments the membrane 13 itself is the impervious part, and is therefore inserted between the sleeve 6 and the clapper 8.

For example, the membrane 13 caps and covers the face 10. This ensures an adequate and exact centering operation in its zone, and guarantees air- and water-tightness. Up to a certain height, the membrane 13 also covers a certain height of the side face of the cap 21 which forms the clapper 8. The membrane 13 then diverges and reaches the strip 15 of the body sleeve 6 of the valve 1. The zone is impervious. It can be stiffened by the insertion of an intermediate brass plate 36. The pressure exerted by the clapper 8 will thus be resisted to a better degree. The clapper 8, along with the thrust-stop 12 and the strip 15, can be manufactured in a molded plastic material.

Having described the invention in detail, those skilled in the art will appreciate that modifications may be made of the invention without departing from its spirit. Therefore, it is not intended that the scope of the invention be limited to the specific embodiments described. Rather, it is intended that the scope of this invention be determined by the appended claims and their equivalents.

What is claimed is:

1. A safety valve comprising
a valve body having an inner wall defining a chamber;
an inlet conduit in fluid communication with said chamber;
an outlet conduit in fluid communication with said chamber and downstream of said inlet conduit;
a clapper, mounted in said chamber to be movable between a first position, in which said clapper seals against a seat to close said inlet conduit, and a second position, in which said clapper is spaced from said seat, allowing fluid flow from said inlet conduit through said chamber to said outlet conduit;
a spring, positioned to bias said clapper towards said first position and provide sufficient resistance to maintain said clapper in its first position until a predetermined fluid pressure is exerted on said clapper through said inlet conduit;
a thrust stop having a first surface against which said spring bears, said thrust stop being mounted to said valve body, interposed between said valve body and said clapper, with a second, inner wall surface disposed in a manner to guide movement of said clapper between its first and second positions;
an impervious membrane, positioned between said clapper and said seat, an outer edge of said membrane being fixed between a third surface of said thrust stop and a first inner surface of said valve body; and
an operating assembly connected with said clapper, said operating assembly comprising a handling member and a handling rod mounted on said handling member and operatively attached to said clapper, said handling member defining a first camming surface and said thrust stop defining an opposed, second complementary camming surface, relative rotation of said first and second camming surfaces causing axial displacement of said handling rod to move said clapper from said first position to said second position.

2. The safety valve of claim 1, wherein said thrust stop includes a cap in which said spring is centered.

3. The safety valve of claim 1, wherein said clapper is shaped like a supporting cupel on which said spring is centered.

4. The safety valve of claim 1, wherein said handling rod, mounted on said handling member, passes through said thrust-stop.

5. The safety valve of claim 1, wherein said second, inner wall surface of said thrust-stop guides translation of said clapper by engaging in sliding fashion with an outer wall of said clapper.

6. The safety valve of claim 1, wherein a foot portion of said handling rod is operatively associated with said clapper in a manner which provides at least one degree of freedom.

7. The safety valve of claim 6, wherein said clapper is mounted on said foot portion by elastically deflecting said foot portion such that it engages a portion of said clapper in an irreversible manner.

8. The safety valve of claim 1, wherein said thrust stop includes a skirt, said skirt having a rim dimensioned to elastically engage a second inner surface of said valve body.

9. The safety valve of claim 8, wherein said skirt rises concentrically about an outer wall surface of said thrust stop.

10. The safety valve of claim 8, wherein the distance between said rim and said third surface of said thrust stop is substantially equal to the distance between said first inner surface of said valve body and said second inner surface of said valve body minus the thickness of said membrane.

11. The safety valve of claim 10, wherein the area containing said membrane is stiffened by an intermediate plate.

* * * * *

UNITED STATES PATENT AND TRADEMARK OFFICE
CERTIFICATE OF CORRECTION

PATENT NO.   : 5,294,093

DATED        : March 15, 1994

INVENTOR(S)  : Jean L. Huveteau, et al.

It is certified that error appears in the above-identified patent and that said Letters Patent is hereby corrected as shown below:

On the Title page, item [56], References cited, U.S. Patent Documents
Please add:

| | | |
|---|---|---|
| 3,027,905 | 04/03/62 | H.L. Dobrikin |
| 3,757,815 | 09/11/73 | J.D. Orr |
| 4,543,988 | 10/01/85 | J.L. Huveteau |

Foreign Patent or Published Foreign Patent Application

| | | |
|---|---|---|
| 2 203 820 | 10/26/88 | Great Britain |
| 2 575 264 | 06/27/87 | France |
| 2 528 526 | 12/16/83 | Franch |

Other Documents
Rapport De Recherche; FR 9116332; 18 Septembre 1992; Lokere H.P.

Col. 2, line 26, after "further" delete the comma.

Signed and Sealed this

Fifteenth Day of August, 1995

Attest:

BRUCE LEHMAN

*Attesting Officer*       *Commissioner of Patents and Trademarks*